United States Patent [19]

Göttling et al.

[11] Patent Number: 5,205,204
[45] Date of Patent: Apr. 27, 1993

[54] WORKING CYLINDER WITHOUT PISTON ROD AND WITH A BRAKING DEVICE, IN PARTICULAR FOR COMPRESSIBLE MEDIA

[75] Inventors: Helmut Göttling, Iserhagen; Rudolf Möller, Gehrden; Horst Janetzko, Celle; Gerhard Scharnowski, Gehrden, all of Fed. Rep. of Germany

[73] Assignee: Mannesmann Aktiengesellschaft, Düsseldorf, Fed. Rep. of Germany

[21] Appl. No.: 731,629

[22] Filed: Jul. 17, 1991

[30] Foreign Application Priority Data

Jul. 17, 1990 [DE] Fed. Rep. of Germany ....... 4023058

[51] Int. Cl.⁵ ............................................ F15B 15/26
[52] U.S. Cl. ......................................... 92/28; 92/88; 188/170
[58] Field of Search ................... 92/88, 15, 18, 19, 24, 92/25, 26, 27, 28; 188/170, 67, 41; 91/44

[56] References Cited

U.S. PATENT DOCUMENTS

| | | | |
|---|---|---|---|
| 3,221,610 | 12/1965 | King et al. | 92/88 |
| 3,599,760 | 8/1971 | Moss | 188/170 |
| 3,871,267 | 3/1975 | Miller | 92/88 |
| 3,893,378 | 7/1975 | Hewitt | 92/88 |
| 4,137,827 | 2/1979 | Hewitt | 92/88 |
| 4,419,924 | 12/1983 | Peter et al. | 188/170 |
| 4,785,716 | 11/1988 | Vaughn et al. | 92/88 |
| 4,926,982 | 5/1990 | Granbom | 188/67 |
| 5,022,499 | 6/1991 | Lundqvist | 92/88 |

FOREIGN PATENT DOCUMENTS

| | | |
|---|---|---|
| 2453948 | 5/1975 | Fed. Rep. of Germany ......... 92/88 |
| 3514074 | 2/1981 | Fed. Rep. of Germany . |
| 3229305 | 2/1984 | Fed. Rep. of Germany . |
| 3328292 | 2/1985 | Fed. Rep. of Germany . |

Primary Examiner—Thomas E. Denion
Attorney, Agent, or Firm—Horst M. Kasper

[57] ABSTRACT

The braking device (2) is formed between a force collector (3) and a cylinder casing (1) by way of slider tracks (5) and counter slider tracks (6) and by sliding bodies (7) guiding the slider tracks and counter slider tracks in a working cylinder without piston rod. The adjusting elements (12) for the setting of a sliding or a braking play can be set according to the sliding bodies (7). In order to achieve a compact construction, a low construction height, as well as a lowest possible number of parts, the braking device (2) is disposed symmetrically to a slider plane and a casing center longitudinal plane (19), respectively. The braking device is furnished with a force member (20) acting in the region (21). The lever element (22) engages centrally in each case with the lever arms (22a, 22b) on the adjusting element (12). A press-on force generating the braking force centrally engages the lever elements (22).

23 Claims, 5 Drawing Sheets

WORKING CYLINDER WITHOUT PISTON ROD AND WITH A BRAKING DEVICE, IN PARTICULAR FOR COMPRESSIBLE MEDIA

BACKGROUND OF THE INVENTION

1. Field of the Invention

The invention relates to a working cylinder without a piston rod, in particular for compressible media, with a braking device disposed between a force collector, which force collector is formed as a slider with guide tracks, and with a cylinder casing for receiving the working cylinder and forming counter guide tracks, where sliding bodies are disposed between the guide tracks and the counter tracks, where the sliding bodies are resting against sliding paths and/or against the counter tracks disposed at the profile sides of the profiled casing and where adjusting elements can be set in the direction toward the sliding bodies for setting a sliding or braking play.

2. Brief Description of the Background of the Invention Including Prior Art

Such working cylinders without piston rods and with a braking device serve for motion in an axial direction, where the piston has to be stopped versus the cylinder casing, where a piston has to be fixed in position versus the cylinder casing and/or where the piston has to be placed in a certain position versus the cylinder casing. For this reason such working cylinders without piston rods and with brake device are employed in pneumatic safety plants and in general, in pneumatic plants.

A braking device for fluid-operated actuating working cylinders without piston rod is known from the German Patent DE-PS 3,229,305, which corresponds approximately to that of the initially described brake device in above section specifying the field of the invention. However, instead of the sliding body, this brake device has a particular pressure body between the sliding track and the sliding counter track within the force collector. Said particular pressure body operates with a sealing element and in particular braking faces are arranged and disposed outside of the sliding track and the sliding counter track.

SUMMARY OF THE INVENTION

1. Purposes of the Invention

It is an object of the present invention to furnish a brake device, which can generate large sustaining forces and which can be integrated into a force collector, without inordinately increasing the outer dimensions of the complete working cylinder.

It is a further object of the present invention to provide a simply constructed and reliable working cylinder suitable for positioning and repositioning the piston element.

It is yet a further object of the present invention to construct a cylinder unit which can easily be operated by hydraulic or pneumatic means but which nevertheless allows a precise positioning of the piston.

These and other objects and advantages of the present invention will become evident from the description which follows.

2. Brief Description of the Invention

According to the present invention, there is provided for a piston-rod-less working cylinder comprising a force collector, formed as a slider, a working cylinder, and slider tracks disposed on the slider. A cylinder casing forms counter slider tracks and receives the working cylinder. Sliding bodies are disposed between the slider tracks and the counter slider tracks. Adjusting elements are positioned and engaged in a direction toward the sliding bodies for adjusting a slide play or brake play, respectively. A braking device is disposed, relative to the slider track and to the counter slider track, at a side distance relative to a slider plane and a casing center longitudinal plane, respectively. A force member is attached to the braking device in an upper region of the braking device between the sliding bodies and the adjusting element, respectively. The force member operates in a region of the casing center longitudinal plane. A lever element engages the adjusting element centrically with lever arms. A press-on force engages the lever element in the center for thereby generating the brake force.

The sliding bodies can rest against the slider tracks and counter slider tracks, respectively, disposed at profile sides of the casing cross-sectional profile.

Preferably, compressible media forms the agent driving the cylinder.

The lever element can be furnished as a bent support, supported in each case on the outside and centered relative to the slider plane and to the casing longitudinal plane, respectively. The lever element in each case can rest between these supports on the adjusting element.

A compressed air pillow for generating brake forces can engage at the lever element. The compressed air pillow can be disposed between the lever element on the one hand, and a support face at the force collector, on the other hand. A pretensioned leaf spring can engage the lever element in the center.

The compressed air pillow can be subjected to compressed air for the purpose of counter balancing and interrupting the brake force. The compressed air pillow can be disposed on a first side of the lever element. The leaf spring can be disposed on a second side of the lever element. The second side of the lever element can be disposed remote relative to the first side of the lever element.

Adjusting screws can be disposed in the casing center longitudinal plane. The adjusting screws can be connected to the lever element. The adjusting screws are adjustable by way of a clamping ring in a direction toward the cylinder casing and the adjusting screws can be stopped in a counter direction.

The lever elements can be furnished as pretensioned leaf springs. The compressed air pillow can be disposed facing the cylinder casing. The lever element, formed as a leaf spring element, can be supported on balls. The balls can be supported in a region of the adjusting elements disposed remote relative to the sliding bodies.

According to the present invention there is provided a working cylinder without a piston rod having a particular structure which includes the following features:

(a) with reference to a pairing of a track and a counter track, the brake device, comprising sliding bodies and adjusting elements, is in each case disposed at a lateral distance relative to a slider plane and casing, center longitudinal plane, respectively, (b) the brake device is further furnished with a force member in an upper region between the sliding bodies and the adjusting element, respectively, which force member acts in the region of the casing center longitudinal plane, and (c) a lever element engages with lever arms in each case centrically onto the adjusting elements and where a press-on force engages at the middle of the lever elements generating a braking force.

The integration of the sliding play and of the braking play saves a larger expenditure in parts, and allows in addition to dispose the force generating elements for the braking force in the form of a very flat attachment. This generates a particularly compact construction of the overall piston-rod-less working cylinder and sufficiently high braking forces can now be generated, i.e. higher forces than those provided by the structures according to the state of the art. In addition, a more economic production is possible in that a working cylinder can easily be furnished with and without the brake device.

According to particular embodiments of the invention, it is provided that the lever element is formed out of bent supports, supported in each case on the outside and concentric relative to the slider plane and to the casing center longitudinal plane, respectively, and where in each case the lever element is resting between said supports on the adjusting elements. These measures as well assure an extremely flat construction and the symmetric transfer of braking forces onto the respective pair of sliding tracks with sliding counter tracks.

Further features of the invention comprise that the braking forces, engaging at the lever element, can be generated by a compressed air pillow. This measure eliminates a sealing by means of a sealing element, as is employed in structures based on the state of the art, and which sealing element is subject to wear.

According to further features, it is provided that the compressed air pillow is disposed, on the one hand, between the lever element and a support face at the force collector, on the other hand. Advantageously, the compressed air pillow is thereby well guided, supported, and protected, and not subjected to external influences such as temperature, dirt, and the like, within the apparatus.

Further features of the invention comprise that one or several pretensioned leaf springs engage at the center of the lever element and that the compressed air pillow can be subjected to compressed air for the purpose of counterbalancing and lifting the braking force. Thereby, the lever element is, on the one hand, retained in a zero position and, on the other hand, defined support faces are available for the compressed air pillow. It is however particularly advantageous that either the braking force can be supplied via a pretensioned leaf spring or, instead the braking force can be supplied via the compressed air pillow. For this purposes it is provided that the compressed air pillow is disposed on the one side of the lever element and that the leaf spring is disposed on a second side of the lever element.

A further advantageous embodiment of the invention comprises that in each case adjusting screws are disposed in the casing center longitudinal plane and that the adjusting screws are connected to the lever element. Said adjusting screws are adjustable by way of a clamping element or a locking ring in a direction toward the cylinder casing and are lockable in a counter direction. Advantageously, these features furnish an additional compensation for play. Starting from the practical experience that sliding guides are subjected to wear and that they have to be readjusted for this reason after a certain time period has elapsed, if it is desired that the guide quality is to be maintained, the characterized feature avoids this readjustment and assures an always constant guide play over a wide range.

According to a further alternative embodiment of the invention, it is provided that the lever elements are provided as a pretensioned leaf spring element, wherein the compressed air pillow is disposed towards the cylinder casing. Thus, in this case, the leaf spring and lever element are combined to a single part, wherein, however, the function of the leaf spring and of the lever element remain. According to this embodiment, a decrease of the number of the individual components is therefore particularly apparent.

It is further provided according to the improved feature of the invention, that the lever element furnished as a leaf spring element is supported on balls, which balls are supported in the region of the adjusting elements remote relative to the sliding bodies.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

In the accompanying drawings, in which are shown several of the various possible embodiments of the present invention.

DESCRIPTION OF INVENTION AND PREFERRED EMBODIMENT

Figure 1:
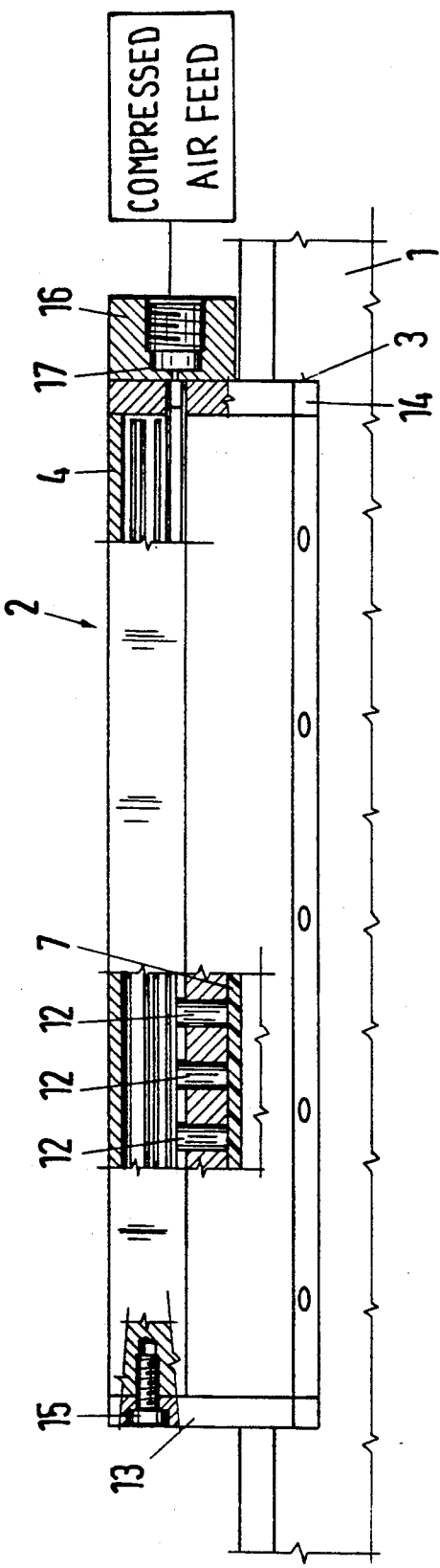
FIG. 1 is a side-elevational view of a braking device which is additionally complementing a working cylinder without a piston rod.

According to the present invention, there is provided for a piston-rod-less working cylinder, in particular for compressible media, with a braking device between a force collector. The collector is formed as a slider with slider tracks. A cylinder casing forms counter slider tracks and receives the working cylinder. Sliding bodies are disposed between the slider tracks and the counter slider track. The sliding bodies rest against the slider tracks disposed at profile sides of the casing cross-sectional profile and/or against the counter slider tracks. adjusting elements are positioned and engaged in a direction toward the sliding bodies for adjusting a slide play or brake play, respectively. The braking device, including sliding bodies 7 and adjusting elements 12, is disposed, relative to a pair of a slider track 5 and of a counter slider track 6, in each case with a side distance relative to a slider plane and a casing center longitudinal plane 19, respectively. The braking device 2 is additionally furnished in an upper region between the sliding bodies 7 and the adjusting element 12, respectively, with a force member 20. The force member 20 operates in a region 21 of the casing center longitudinal plane 19. A lever element 22 engages with lever arms 22a, 22b in each case centrically the adjusting element 12. A press-on force engages the lever element 22 in the center for thereby generating the brake force.

The lever element 22 can be furnished as a bent support, supported in each case on the outside and centered relative to the slider plane and to the casing longitudinal plane 19, respectively. The lever element 22 can in each case rest between these supports on the adjusting element 12.

The brake forces engaging at the lever element 22 can be generated by a compressed air pillow 25. The compressed air pillow 25 can be disposed between the lever element 22, on the one hand, and a support face 26 at the force collector 3, on the other hand. One or several pretensioned leaf springs 27 can engage the lever element 22 in the center. The compressed air pillow 25 can be subjected to compressed air for the purpose of counter balancing and interrupting the brake force. The compressed air pillow 25 can be disposed on a first side of the lever element 22. The leaf spring 27 can be disposed on a second side of the lever element 22. The second side of the lever element 22 can be disposed remote relative to the first side of the lever element 22.

Adjusting screws 28 can be disposed in the casing center longitudinal plane 19. The adjusting screws 28 can be connected to the lever element 22. The adjusting screws 28 can be adjusted by way of a clamping ring 30 in a direction towards the cylinder casing 1. The adjusting screws 28 can be stopped in a counter direction.

The lever elements can be furnished as pretensioned leaf springs. The compressed air pillow 25 can be disposed facing the cylinder casing 1. The lever element 22, formed as a leaf spring element 32, can be supported on balls 33. The balls 33 can be supported in a region of the adjusting elements 12 disposed remote relative to the sliding bodies 7.

A working cylinder without a piston rod is disposed in a cylinder casing 1 and operates preferably with compressed air. A braking device 2, illustrated in FIG. 1, is disposed above the cylinder casing 1. The individual parts of the braking device are disposed between a force collector 3 and a casing cover 4 substantially under the casing cover 4 based on a flat construction. The force collector 3 is furnished as a slider 3a. The slider 3a is furnished with recesses 3b. The sliding bodies 7 are inserted into the recesses 3b. The cylinder casing is formed with sliding tracks 5 and sliding counter tracks 6. The tracks 5 and the counter tracks 6 are disposed such relative to each other that the slider 3a surrounds and envelopes the tracks 5 and the counter tracks 6 such that a possible lifting off is avoided. The sliding bodies 7 are set to a play range during assembly by way of adjusting screws 8 and by way of pressure strips 9, disposed below the adjusting screws 8. Based on said play range, the force collector 3 can be moved back and forth as a slider 3a. This play is therefore to be set in each case between the sliding body 7 and counter track 6 of the casing cross-sectional profile 11. The play, however, is only then defined when adjusting elements 12 are adjusted via the sliding bodies 7, and wherein the play is in fact a sliding play.

Figure 2:
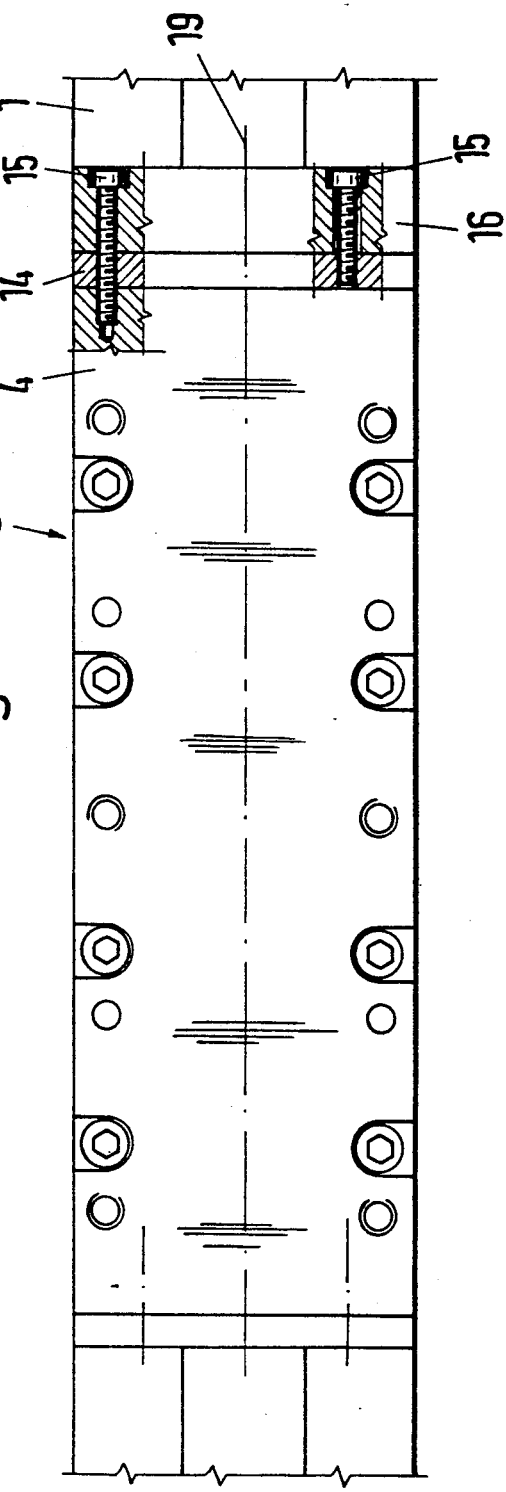
FIG. 2 is a plan view onto the embodiment of FIG. 1.

The braking device extends, as illustrated in FIGS. 1 and 2, over the full length of the force collector 3. In each case a plate 13 and 14 is attached by way of screws 15 as terminal plates at the ends of the casing cover 4. The sliding body 7 is disposed under the adjusting element 12 disposed in rows. The plates 13 and 14 define the position of the sliding bodies 7 in longitudinal direction. According to the embodiments illustrated in the following, there is provided in each case a connector 16 to a fluid medium supply, where the connector port 17 of the fluid medium connector 16 allows entering of the fluid medium. The fluid medium can be in particular a gas or a liquid such as, for example, compressed air.

Figure 3:
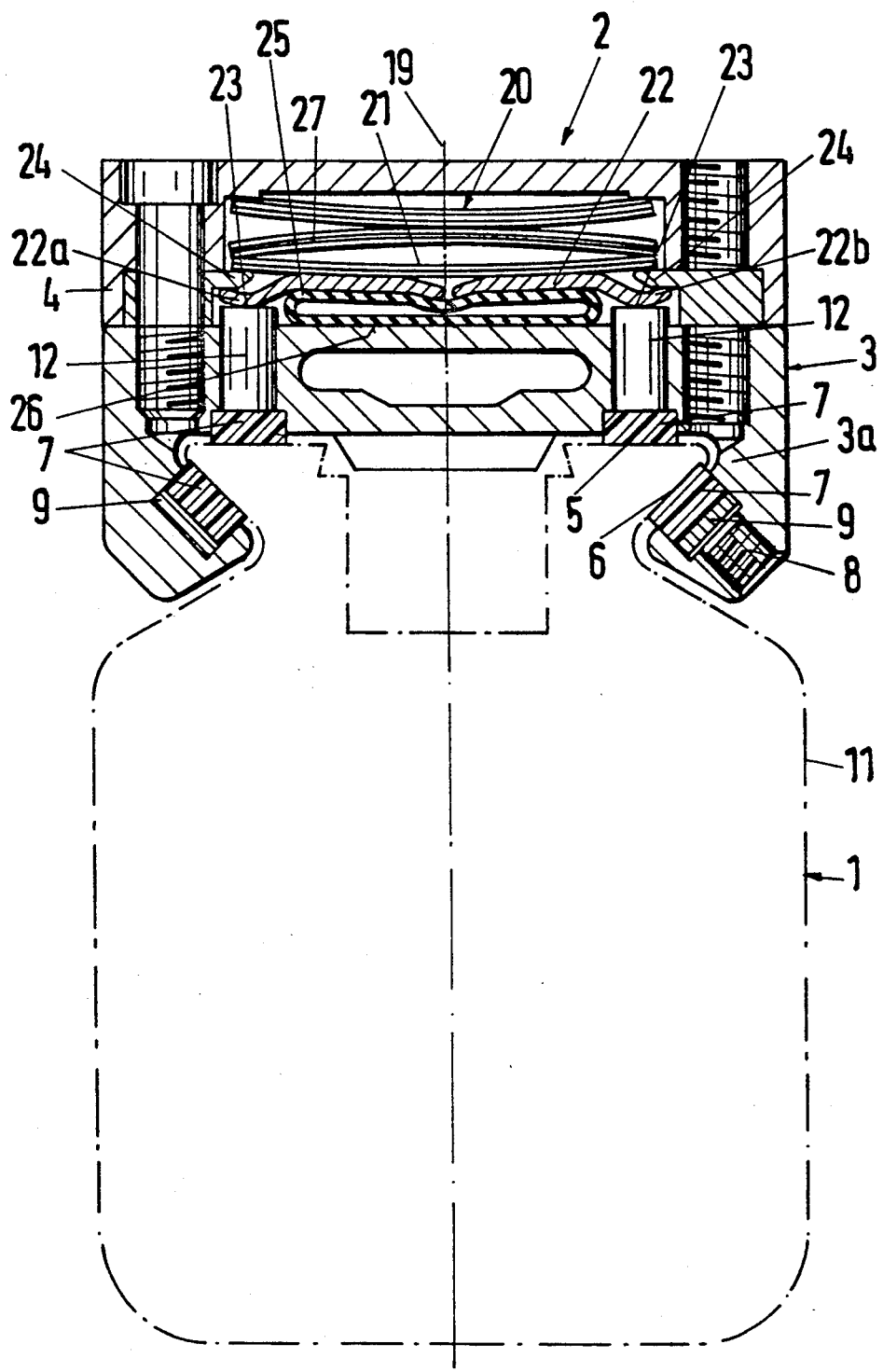
FIG. 3 is a cross-sectional view through a working cylinder without a piston rod and with a braking device according to a first embodiment.

According to a first embodiment illustrated in FIG. 3, the braking device 2 operates with spring force, wherein the counterbalancing and overcoming of the spring force is performed, however, with compressed media such as, for example, compressed air.

In relation relative to a pairing of the track 5 and the counter track 6, the braking device 2 is in each case disposed symmetrically relative to a slider plane and casing center longitudinal plane 19, respectively. The braking device 2 is furnished furthermore with a force member 20, which force member 20 operates in a central region 21 of the casing center longitudinal plane 19. In addition, there is furnished a lever element 22, which lever element rests with lever arms 22a and 22b in each case centrically on the adjusting elements 12 and in fact in each case via protrusions 23. The brake force itself engages in the region of the casing center longitudinal plane 19 at the lever element 22.

The lever element 22 thus forms a bent support in cross-section. The bent support is in each case supported on the outside and centered relative to the slider plane and casing center longitudinal plane 19, respectively. The bent support is supported and rests between supports on the adjusting elements 12. In this case, the supports on the outside are advantageously formed projections 24 of the casing cover 4. The press-on forces engaging at the lever element 22, for example, a clamping force, in order to put the force collector 3 into a rest position, are generated by a common compressed air pillow 25. The compressed air pillow 25 is disposed between the lever element 22 on the one hand, and a support face 26 on the force collector 3 on the other hand. One or several pretensioned leaf springs 27 engage centrally at the lever elements 22, where the force of the pretensioned leaf springs 27 can be balanced and lifted, in that the compressed air pillow 25 is subjected to compressed air for the purpose of counterbalancing the brake force. If the brake force is to be reset to zero, the compressed air pillow 25 is to be released from pressure.

Figure 4:
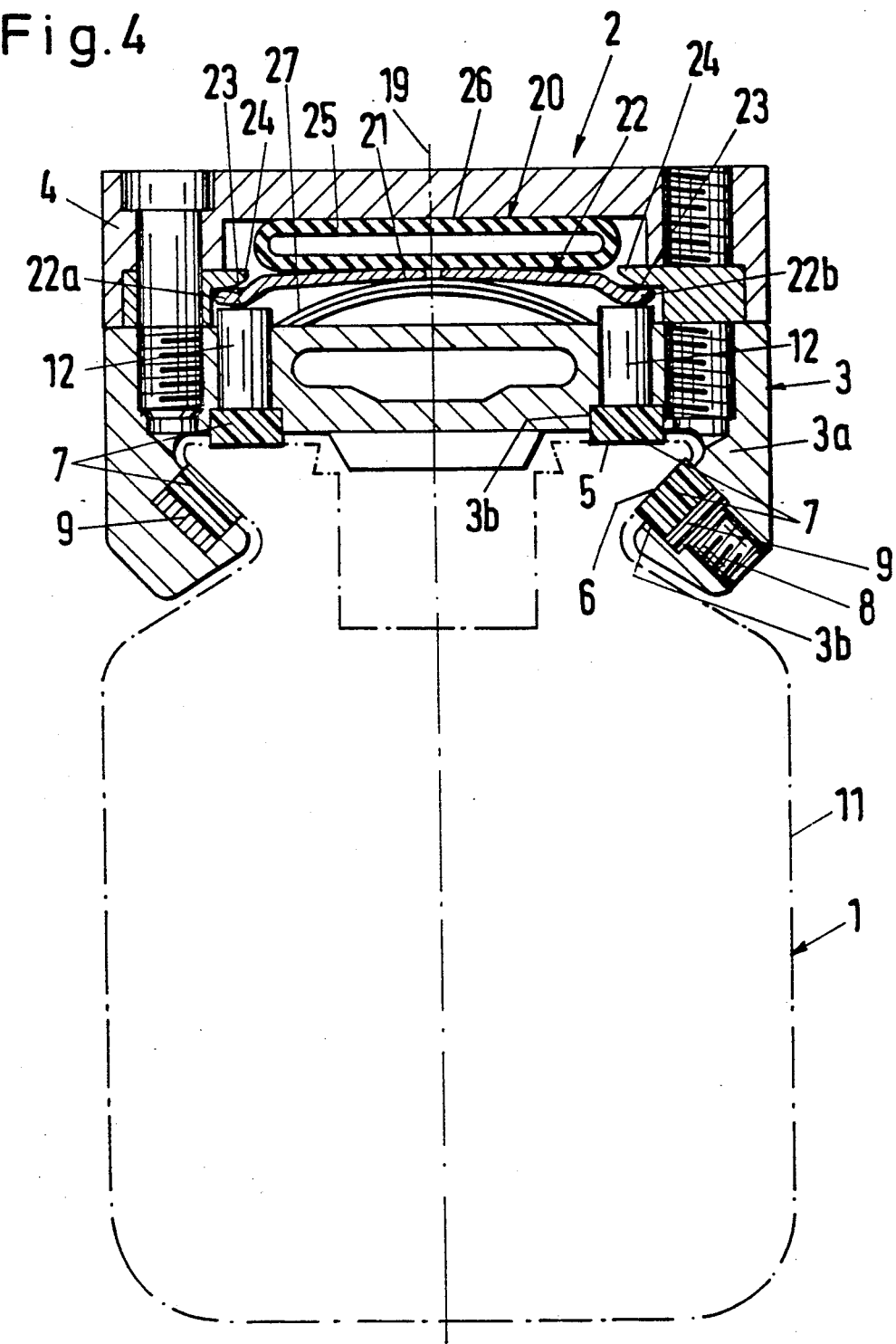
FIG. 4 is a cross-sectional view through a working cylinder without a piston rod and with a braking device according to a second embodiment.

According to a second embodiment illustrated in FIG. 4, the braking device 2 operates by compressed air and the release of the brake is performed by a pressure release. The compressed air pillow 25 is in this case disposed on a first side of the lever element 22, and the leaf spring 27 is disposed on a second side of the lever element 22. In this case, the support face 26 rests at the inner side of the casing cover 4.

Figure 5:
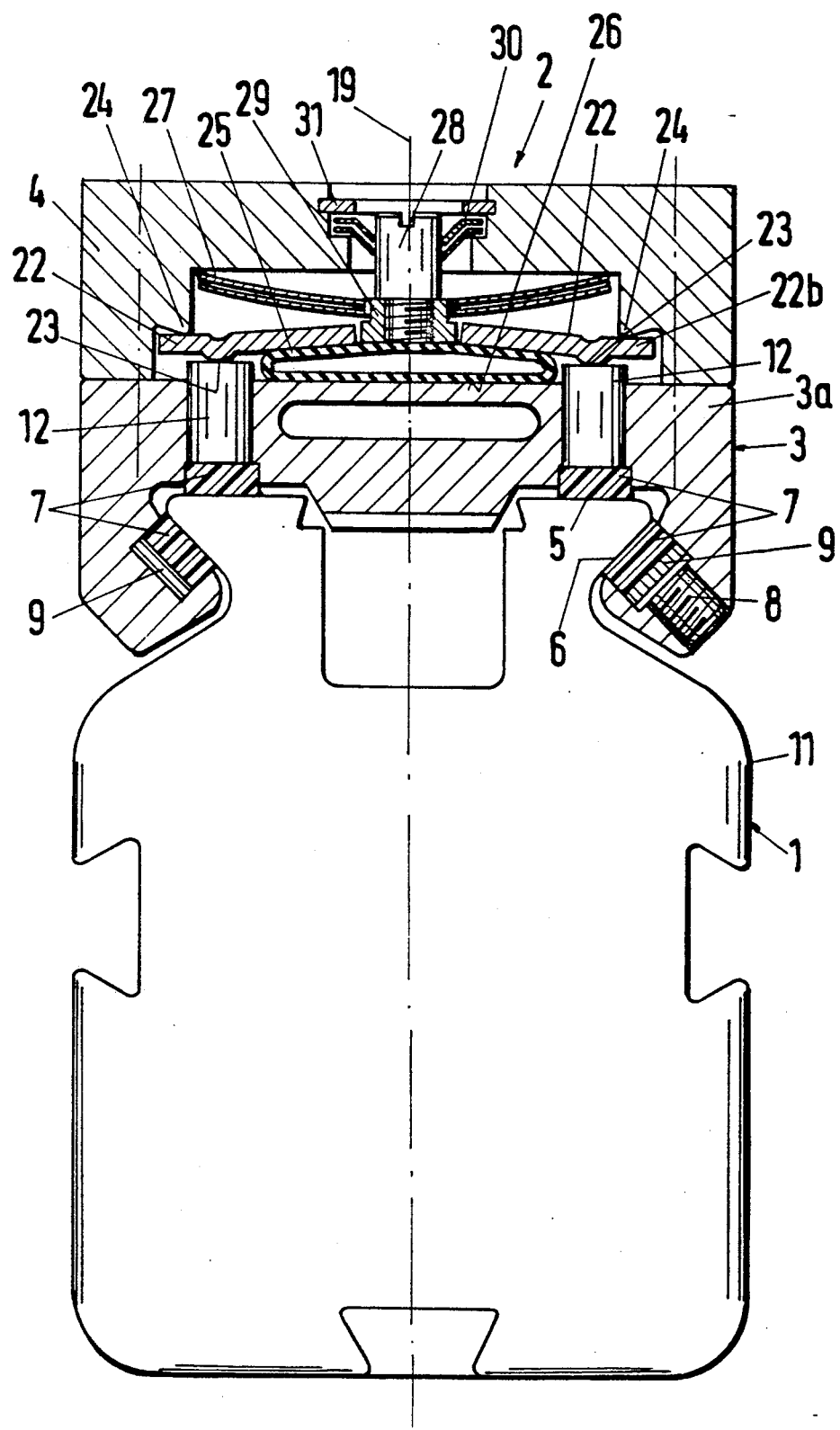
FIG. 5 is a cross-sectional view through a working cylinder without a piston rod and with a braking device according to a third embodiment.

According to a third embodiment illustrated in FIG. 5, an automatic play compensation is provided. For this purpose, adjusting screws 28 are disposed in a row sequence, and can in each case be screwed into and out of a nut 29.

The nut 29 is inserted into the leaf spring 27 secured against rotation in the longitudinal axis, formed within the slider plane and casing center longitudinal plane 19, respectively. Clamping rings 30 or locking rings are disposed in the casing cover 4 such that they are delimited downwardly by a projection and that they are delimited upwardly by a securing ring 31, and in fact such that the clamping rings 30 exhibit a play in axial direction and that they are thereby solidly clamped with their inner part on the adjusting screw 28. The adjusting screw 28 can thereby be moved downwardly, i.e. the adjusting screw 28 slides through in a certain way while the adjusting screw is blocked in opposite direction. A certain motion is allowed based on the play between the clamping ring 30 and the securing ring 31. This certain motion play is transferred to the track 5 and/or the counter track 6 and the play limits the opening path and thus the guide play to a predetermined amount upon lifting and cancelling of the brake force. If wear occurs, then the device is readjusted in such way that the adjusting screws 28 slide through downwardly in the clamping ring.

Figure 6:
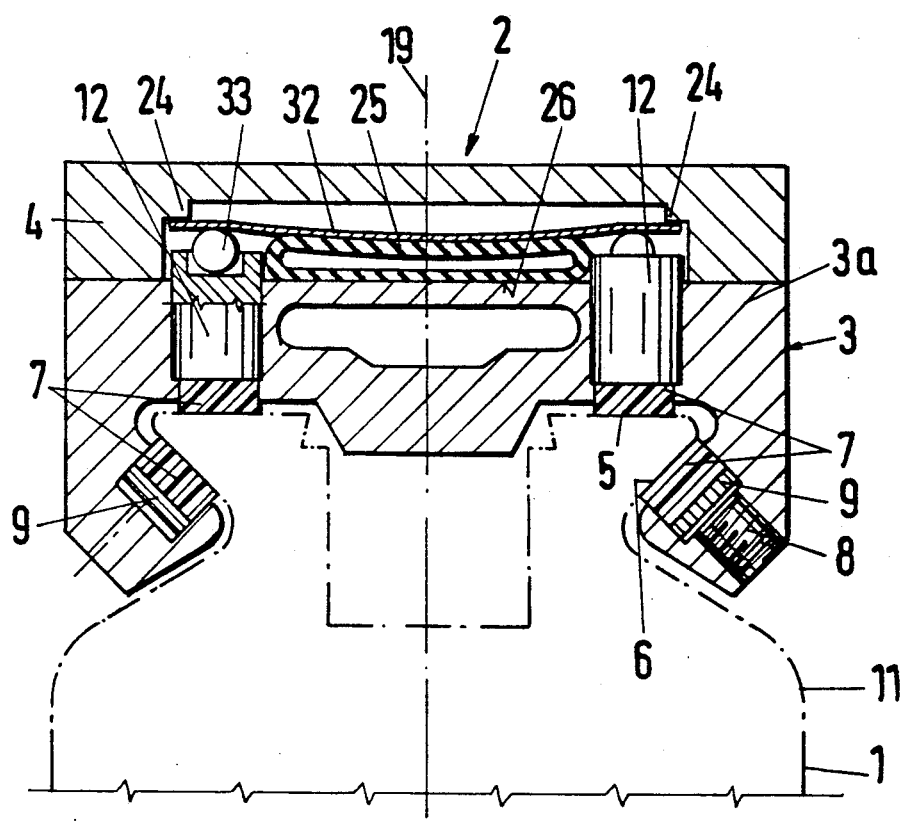
FIG. 6 is a partial, sectional view of the cross-section of the embodiment of FIG. 3, according to a fourth embodiment.

According to a fourth embodiment illustrated in FIG. 6, the lever element 22 and the leaf spring 27 are united to a single leaf spring element 32. The compressed air pillow 25 is again disposed facing the cylinder casing 1.

The lever element 22, formed as leaf spring element 32, is supported on balls 33, which are supported in the region of the adjusting elements 12 disposed relative remote to the sliding bodies 7.

It will be understood that each of the elements described above, or two or more together, may also find a useful application in other types of working cylinders and pneumatic safety devices differing from the types described above.

While the invention has been illustrated and described as embodied in the context of a working cylinder without a piston rod and with a braking device, in particular for compressible media, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A piston-rod-less working cylinder comprising
    a force collector formed as a slider;
    a working cylinder;
    slider tracks disposed on the slider;
    a cylinder casing forming counter slider tracks and receiving the working cylinder;
    sliding bodies disposed between the slider tracks and the counter slider tracks;
    adjusting elements positioned and engaged in a direction toward the sliding bodies for adjusting a slide play or brake play, respectively;
    a braking device disposed, relative to the slider track and to the counter slider track, at a side distance relative to a slider plane and a casing center longitudinal plane, respectively;
    a force member attached to the braking device in an upper region of the braking device between the sliding bodies and an adjusting element, respectively, wherein the force member operates in a region of the casing center longitudinal plane;
    a lever element engaging the adjusting element centrically with lever arms, and where a press-on force engages the lever element in the center for thereby generating the brake force.

2. The piston-rod-less working cylinder according to claim 1, wherein
    the sliding bodies rest against the slider tracks disposed at profile sides of the casing cross-sectional profile.

3. The piston-rod-less working cylinder according to claim 2, wherein
    the sliding bodies rest against the counter slider tracks disposed at profile sides of the casing cross-sectional profile.

4. The piston-rod-less working cylinder according to claim 1, wherein
    the sliding bodies rest against the counter slider tracks disposed at profile sides of the casing cross-sectional profile.

5. The piston-rod-less working cylinder according to claim 1, wherein
    the sliding bodies rest on the counter slider tracks.

6. The piston-rod-less working cylinder according to claim 1, further comprising
    compressible media forming the agent driving the cylinder.

7. The piston-rod-less working cylinder according to claim 1, wherein
    the lever element is furnished as a bent support, supported on the outside and center relative to the slider plane and to the casing longitudinal plane, respectively, and wherein the lever element rests between supports on the adjusting element.

8. The piston-rod-less working cylinder according to claim 1, further comprising
    a compressed air pillow for generating brake forces engaging at the lever element.

9. The piston-rod-less working cylinder according to claim 8, wherein
    the compressed air pillow is disposed between the lever element on the one hand, and a support face at the force collector, on the other hand.

10. The piston-rod-less working cylinder according to claim 9, further comprising
    a pretensioned leaf spring for engaging the lever element in the center, and wherein the compressed air pillow is subjected to compressed air for the purpose of counter balancing and interrupting the brake force.

11. The piston-rod-less working cylinder according to claim 10, wherein
    the compressed air pillow is disposed on a first side of the lever element, wherein the leaf spring is disposed on a second side of the lever element, and wherein the second side of the lever element is disposed remote relative to the first side of the lever element.

12. The piston-rod-less working cylinder according to claim 1, further comprising
    adjusting screws disposed in the casing center longitudinal plane, wherein the adjusting screws are connected to the lever element, wherein the adjusting screws are adjustable by way of a clamping ring in a direction toward the cylinder casing, and wherein the adjusting screws are stopped in a counter direction.

13. The piston-rod-less working cylinder according to claim 1, wherein the lever element is furnished as a pretensioned leaf spring, and wherein a compressed air pillow is disposed facing the cylinder casing.

14. The device according to claim 13, wherein the lever element formed as a leaf spring element is supported on balls, which balls are supported in a region of the adjusting elements disposed remote relative to the sliding bodies.

15. A piston-rod-less working cylinder, for compressible media, with a braking device between a force collector, wherein the collector is formed as a slider with slider tracks, and a cylinder casing forming counter slider tracks and receiving the working cylinder, with sliding bodies disposed between the slider tracks and the counter slider track, wherein the sliding bodies rest against the slider tracks disposed at profile sides of the casing cross-sectional profile and against the counter slider tracks, with adjusting elements, wherein the adjusting elements are positioned and engaged in a direction toward the sliding bodies for adjusting a slide play or brake play, respectively, and wherein
  (a) a braking device, including said sliding bodies (7) and adjusting elements (12), is disposed, relative to a pair of said slider tracks (5) and of said counter slider tracks (6), with a side distance relative to a slider plane and a casing center longitudinal plane (19), respectively;
  (b) the braking device (2) is additionally furnished in an upper region between the sliding bodies (7) and the adjusting elements (12), respectively, with a force member (20), which force member (20) operates in a region (21) of the casing center longitudinal plane (19),
  (c) a lever element (22), which lever element (22) engages with lever arms (22a, 22b) centrically the adjusting elements (12) and where a press-on force engages the lever element (22) in the center for thereby generating the brake force.

16. The device according to claim 15, wherein the lever element (22) is furnished as a bent support, supported on the outside and centered relative to the slider plane and to the casing longitudinal plane (19), respectively, and wherein the lever element (22) rests between supports on the adjusting element (12).

17. The device according to claim 15, wherein the brake forces engaging at the lever element (22) is generated by a compressed air pillow (25).

18. The device according to claim 17, wherein the compressed air pillow (25) is disposed between the lever element (22), on the one hand, and a support face (26) at the force collector (3), on the other hand.

19. The device according to claim 18, wherein one or several pretensioned leaf springs (27) engage the lever element (22) in the center, and wherein the compressed air pillow (25) is subjected to compressed air for the purpose of the counter balancing and interrupting the brake force.

20. The device according to claim 19, wherein the compressed air pillow (25) is disposed on a first side of the lever element (22), wherein the leaf spring (27) is disposed on a second side of the lever element (22), and wherein the second side of the lever element (22) is disposed remote relative to the first side of the lever element (22).

21. The device according to claim 15, wherein
adjusting screws (28) are disposed in the casing center longitudinal plane (19), and wherein the adjusting screws (28) are connected to the lever element (22), wherein the adjusting screws (28) are adjustable by way of a clamping ring (30) in a direction towards the cylinder casing (1), and wherein the adjusting screws (28) are stopped in a counter direction.

22. The device according to claim 15, wherein
the lever elements are furnished as pretensioned leaf springs, and wherein a compressed air pillow (25) is disposed facing the cylinder casing (1).

23. The device according to claim 22, wherein
the lever element (22), formed as a leaf spring element (32), is supported on balls (33), which balls (33) are supported in a region of the adjusting elements (12) disposed remote relative to the sliding bodies (7).

* * * * *